Jan. 31, 1933.  W. H. PEARCE  1,895,727
RECORDING INSTRUMENT FOUNTAIN PEN
Filed Oct. 3, 1931
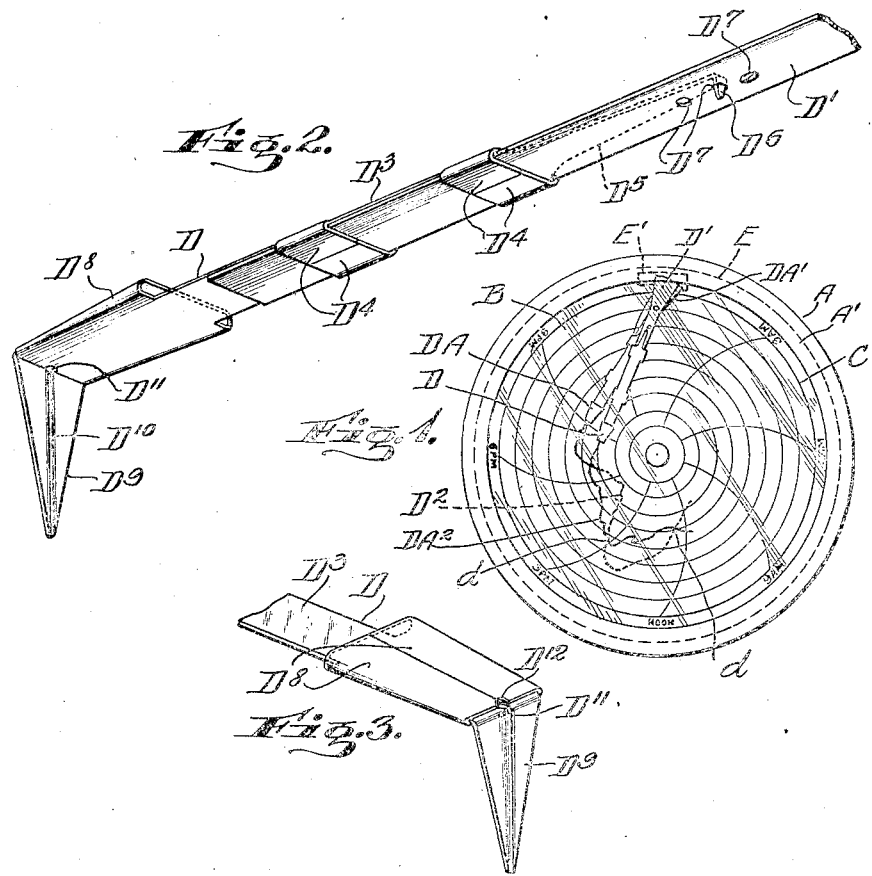
INVENTOR.
WALTER H. PEARCE
BY John E. Hubbell
ATTORNEY Patented Jan. 31, 1933

1,895,727

UNITED STATES PATENT OFFICE

WALTER H. PEARCE, OF CHURCHVILLE, PENNSYLVANIA, ASSIGNOR TO THE BROWN INSTRUMENT COMPANY, OF PHILADELPHIA, PENNSYLVANIA, A CORPORATION OF PENNSYLVANIA

RECORDING INSTRUMENT FOUNTAIN PEN

Application filed October 3, 1931. Serial No. 566,663.

My present invention relates to the construction and arrangement of marking pens of the fountain pen type adapted for use in recording instruments, in which the position of the pen is automatically controlled to produce a record line on a record chart operatively associated with the instrument. More particularly, my invention is concerned with the construction and arrangement of fountain pens especially adapted for use in multiple pen recording instruments in which a plurality of pens simultaneously produce separate records on the same chart.

In such multiple pen recording instruments, the record lines produced may indicate values of different quantities, such as flow, temperature, or pressure, or of the same quantity at different points in the associated apparatus, the separate records advantageously being made in differently colored inks to enable the user to more easily distinguish the records. Since the pens of such instruments are arranged to simultaneously operate on the same section of the record chart and since each pen is ordinarily movable over the full range of chart values, it is now common practice to arrange the pen carrying arms movable in different planes parallel to the chart surface about the same axis and with the pen carried by the outer pen arm positioned beyond the pen carried by the inner pen arm. With this arrangement, the point of the pen carried by the outer arm will be radially spaced from the pen carried by the inner arm and if the chart is properly adjusted relative to the latter, the other pen record will actually be displaced a time interval corresponding to the radial displacement of the marking pen points. It is desirable to have this time differential as small as possible. The design of recording pens for instruments of this type is further complicated by the relatively small space between the record chart surface and the covering glass.

Because of the space limitations and efforts to reduce the time differential between the record lines of the associated pens, the marking pens heretofore used have had ink channels of very minute cross-sectional dimensions and of undesirable shapes and lengths. Ink channels of this character are easily clogged and difficult to clean and even the use of relatively expensive special inks has not wholly eliminated the above troubles.

The general object of my present invention is the provision of a recording instrument fountain pen which eliminates the necessity for ink channels of the disadvantageous character described and which is characterized by its simplicity and relatively low cost of construction, ease of cleaning, assembly and disassembly, and capacity for continued use at maximum efficiency for prolonged periods of time without requiring attention. A further and more specific object is the provision of a pen of the character described which is especially adapted for use in multiple pen recording instruments because of its low space requirements and capacity for arrangement relative to the other pens of such instruments with substantially no time differential between the resultant record lines. A further specific object is the provision of a recording pen with parts for detachably connecting it to its pen arm, the pen and connecting parts being capable of formation from a single sheet metal blank.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described preferred embodiments of the invention.

Of the drawing:

Fig. 1 is a conventional illustration of a multiple pen recording instrument having marking pens constructed in accordance with my invention;

Fig. 2 is a perspective view from the rear of a preferred pen and and pen arm assembly;

Fig. 3 is a perspective view from the front of a portion of the assembly shown in Fig. 2;

Fig. 4 is a plan view of a blank from which the pen and connecting parts may be formed, certain portions of the blank being bent into their final positions; and Fig. 5 is a fragmentary rear view of the pen showing a modified point formation.

In Fig. 1 of the drawing I have conventionally illustrated a multiple pen recording instrument A of a type in which my improved recording pen hereinafter specifically described is especially adapted for use. The instrument A as shown has a casing A' open at its front side and in which the instrument mechanism is housed and a disc shaped record chart B which in use is continuously rotated by a clockwork in the instrument mechanism. The front side of the casing at which the chart B is positioned, is, as usual, closed by a glass plate or cover C.

In the space between the chart surface and the glass C is arranged a pair of recording or marking pens D and DA, mounted on supporting arms D' and DA', respectively, which are connected through a peripheral opening E' formed in a fixed chart supporting plate E to the instrument mechanisms for causing the pens D and DA to independently deflect across the chart surface, leaving record lines $D^2$ and $DA^2$, respectively. The record line $D^2$ is indicated in Fig. 1 by a broken line for the purpose of distinguishing it from the record line $DA^2$. The pen arms D' and DA' are arranged to deflect about the same axis over the entire range of chart values and the pens and pen arms are relatively arranged to permit the pens to freely move across the chart surface without interfering with one another. In the instrument illustrated the pen D is the "outer" pen, the arm D' of which is arranged in a plane nearer the inner side of the glass C than the arm DA' of the "inner" pen DA, and the pen point of which is spaced a slightly greater radial distance than that of the pen DA from their common axis of rotation. The pen D will thus clear the pen DA in its movements. The radial separation of the pen points has a definite time value, which must be taken into account in any study of the chart record lines. If, for example, the chart is properly positioned relative to the pen DA and the pen points are separated radially by a distance corresponding to a chart time value of 15 minutes, the record line $D^2$ must be advanced a corresponding distance on the chart to determine the correct values of the quantities being measured at any definite time.

In accordance with my invention, the pens D and DA are advantageously constructed so as to permit their arrangement in the limited space between the record chart and glass and with their pen points separated radially only by an amount which is substantially negligible. Since the pens D and DA illustrated in Fig. 1 are of identical construction, only the pen D will now be specifically described.

As shown in Figs. 2, 3 and 4, the pen D may be formed from a single blank of sheet metal, such as German silver, stamped to the form shown in Fig. 4. The blank is formed with a strip-like shank portion $D^3$ having one or more pairs of ears $D^4$ and terminating at one end in a tapering tongue $D^5$. In assembling the pen in the instrument, the end of the tongue is bent and the bent portion $D^6$ inserted through one of the holes $D^7$ in the strip-like pen arm D' and, if desired, clinched over at the rear thereof. The connection between the pen shank and arm is completed by bending the ears $D^4$ around the free end of the pen arm, as shown in Fig. 2.

The lower portion of the pen shank is formed with a pair of ears $D^8$, which are bent forwardly and then towards one another into the form of a flattened truncated cone open at its upper enlarged end. The contacting edge portions of the ears $D^8$ are sealed together in any suitable manner, and the lower ends of the ears similarly connected to the adjacent shank surface. The flattened chamber so formed at the front side of the shank serves as the ink reservoir.

The remaining portion of the pen is formed by a triangularly shaped point $D^9$, along the center line of which an open V-shaped capillary ink channel $D^{10}$ is impressed. The pen point is bent at approximately right angles to the bottom of the ink reservoir and at the opposite side of the shank therefrom. The inner end of the ink channel $D^{10}$ when the point is bent registers with a small opening $D^{11}$ formed in the rear side of the ink reservoir, and through which ink is delivered to the capillary channel. Cleaning of the ink channel is facilitated and the communication with the ink reservoir improved by the formation of a small semicircular hole $D^{12}$ at the base of the ink reservoir front wall and in register with the opening $D^{11}$. In the construction shown, the hole $D^{12}$ is advantageously formed by the arcuately cut-away corner portions $D^{13}$ of the ears $D^8$.

In the construction described, the flatness of the various parts, and particularly of the ink reservoir, substantially reduces the space requirements for the pen movements. The ink reservoir is of sufficient capacity to permit continued use of the pen for prolonged periods of time without replenishing the supply of ink, while its flatness is further advantageous in providing a capillary drag on the flow of ink to the pen point, thereby preventing flooding of the open ink channel. The formation of the pen and connecting parts from a single stamped sheet metal blank considerably lowers the cost of manufacture and permits of quantity production. The adjustable mounting of the pen on the pen arm and the ease of adjustment of the pen point angle enable it to be readily used in conjunction with marking pens of this or other types. In the formation of the blank, the pen point is of sufficient length to permit its reduction to other lengths suitable for smaller sized pens.

When the pen construction described is used in a multiple pen recording instrument, the individual pens are usually provided with inks of different colors. When the record line of the "outer" pen crosses the record line of the "inner" pen, as at the points $d$ in Fig. 1, there is a tendency for some of the undried ink left by the inner pen to be drawn to the outer pen. The resultant mixing of the different colored inks spoils the appearance and decreases the clarity of the record curves. In Fig. 5, a pen point formation is illustrated which reduces this tendency to a negligible degree. For this purpose, the pen point $D^9$ is formed with a non-indented end portion $D^{14}$ arranged in and dividing the open flow channel $D^{10}$ into two parts.

While in accordance with the provisions of the statutes, I have illustrated and described the best forms of my invention now known to me, it will be apparent to those skilled in the art that changes may be made in the form of the device disclosed without departing from the spirit of my invention as set forth in the appended claims, and that certain features of my invention may sometimes be used to advantage without a corresponding use of other features.

Having now described my invention what I claim as new and desire to secure by Letters Patent, is:

1. A fountain pen for recording instruments comprising a shank portion adapted to be connected to a pen supporting arm, an ink reservoir arranged along one side of said shank portion, and a pen point extending transversely away from said shank portion at the opposite side of the latter from said ink reservoir and having an open capillary ink channel formed therein and in communication with said ink reservoir.

2. A fountain pen for recording instruments comprising a shank portion adapted to be connected to a pen supporting arm, an ink reservoir in the form of a flattened truncated cone arranged along one side of said shank portion, and a pen point extending transversely away from said shank portion at the opposite side of the latter from said ink reservoir and having an open capillary ink channel formed therein and in communication with said ink reservoir.

3. A fountain pen for recording instruments comprising a shank portion adapted to be connected to a pen supporting arm, an ink reservoir arranged along one side of said shank portion, and a pen point integrally connected to said shank portion and extending transversely away from said shank portion at the opposite side of the latter from said ink reservoir and having a capillary ink channel formed therein and in communication with said ink reservoir.

4. A fountain pen for recording instruments comprising a shank portion adapted to be connected to a pen supporting arm, an ink reservoir arranged at one side of said shank portion, and a pen point extending transversely away from said shank portion at the opposite side of the latter from said ink reservoir and having a capillary ink channel formed therein and in communication with said ink reservoir, said shank portion, ink reservoir, and pen point having a one-piece integral formation.

5. A fountain pen for recording instruments comprising a shank portion adapted to be connected to a pen supporting arm, a pair of ears projecting from the side edges of said shank portion and having fluid-tight connections with one another and with said shank portion and uniting with the latter to form an ink reservoir, and a pen point extending transversely away from said shank portion at the opposite side of the latter from said reservoir and having a capillary channel in communication with said reservoir.

6. A fountain pen for recording instruments comprising a shank portion adapted to be connected to a pen supporting arm, a pair of integral ears projecting from opposite side edges of said shank portion and having fluid-tight connections with one another and with said shank portion and uniting with the latter to form an ink reservoir open at one end, and a pen point integrally connected to and extending transversely away from said shank portion at the opposite side of the latter from said reservoir and having a capillary channel in communication with said reservoir.

7. A fountain pen for recording instruments comprising a shank portion adapted to be connected to a pen supporting arm, an ink reservoir arranged along one side of said shank portion, and a pen point extending transversely away from said shank portion at the opposite side of the latter from said ink reservoir and having an open capillary ink channel formed therein and in communication with said ink reservoir, said ink channel being divided at the marking end of said pen.

8. A fountain pen for recording instruments comprising a shank portion adapted to be connected to a pen supporting arm, an ink reservoir arranged at one side of said shank portion, and a pen point connected to said shank portion and extending at an angle therefrom at the side opposite said ink reservoir and having an open capillary ink channel formed therein, an opening in the rear wall of said ink reservoir registering with said channel, and an opening in the front wall of said ink reservoir registering with said rear wall opening.

9. In a multiple pen recording instrument, the combination with a pivoted pen supporting arm having an opening formed therein, of a pen comprising a shank portion having a tongue engaging in said arm opening and supplemental means thereon engaging said arm at a point longitudinally spaced from said arm opening, an ink reservoir arranged at one side of said shank portion, and a pen point extending at an angle from said shank portion and having a capillary ink channel formed therein and in communication with said reservoir.

10. In a multiple pen recording instrument, the combination with a pivoted pen supporting arm having an opening formed in an intermediate portion thereof, of a pen comprising a shank portion having a tongue engaging in said arm opening and integral ears bent around said arm, an ink reservoir arranged at one side of said shank portion, and a pen point extending at an angle from said shank portion and having a capillary ink channel formed therein and in communication with said reservoir.

11. In a multiple pen recording instrument, the combination with a pivoted pen supporting arm having an opening formed in an intermediate portion thereof, of a pen comprising a shank portion having a tongue engaging in said arm opening and integral ears bent around said arm, an ink reservoir arranged at one side of said shank portion, and a pen point connected to said shank portion and extending at an angle therefrom at the side opposite said reservoir and having a capillary ink channel formed therein and in communication with said reservoir.

12. In a multiple pen recording instrument, the combination with a pivoted strip-like pen supporting arm having an opening formed in an intermediate portion thereof, of a pen comprising a strip-like shank portion having a tongue engaging in said arm opening and integral ears bent around said arm, a flattened ink reservoir arranged along one side of said shank portion, and a pen point integrally connected to said shank portion and extending at an angle therefrom at the side opposite said reservoir and having a capillary ink channel formed therein and in communication with said reservoir.

13. A fountain pen for recording instruments comprising an ink reservoir, and a pen point extending away from said reservoir and having an elongated open capillary ink channel formed therein and in communication with said ink reservoir, said ink channel being divided at the marking end of said pen.

14. A fountain pen for recording instruments comprising a flattened ink reservoir and adapted to be secured to a depending pen supporting arm with one flattened side of said reservoir in close proximity to the plane of said arm, and comprising a pen point extending away from said reservoir at the bottom of the latter and transversely of said flattened side and having a capillary ink groove formed in its upper side and in communication with said reservoir.

15. A fountain pen for recording instruments comprising a shank portion adapted to be connected to a pen supporting arm and an ink reservoir arranged alongside of said shank portion and flattened to diminish the extent to which it projects transversely away from said shank portion, and a pen point extending transversely away from said shank portion and reservoir and having an open capillary ink channel formed therein and in communication with said ink reservoir.

Signed at Philadelphia, in the county of Philadelphia and State of Pennsylvania, this first day of October, A. D. 1931.

WALTER H. PEARCE.